United States Patent
Oshima

(10) Patent No.: US 8,414,457 B2
(45) Date of Patent: Apr. 9, 2013

(54) CONTROL DEVICE AND CONTROL METHOD FOR AUTOMATIC TRANSMISSION

(75) Inventor: Koji Oshima, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 381 days.

(21) Appl. No.: 12/764,452

(22) Filed: Apr. 21, 2010

(65) Prior Publication Data

US 2010/0292048 A1 Nov. 18, 2010

(30) Foreign Application Priority Data

May 13, 2009 (JP) ................................. 2009-116645

(51) Int. Cl.
*F16H 61/00* (2006.01)

(52) U.S. Cl.
USPC .......................................................... 477/148

(58) Field of Classification Search .................. 477/109, 477/148, 154
See application file for complete search history.

(56) References Cited

U.S. PATENT DOCUMENTS

| 6,929,583 B2 * | 8/2005 | Ayabe et al. .................. 477/109 |
| 7,247,126 B2 * | 7/2007 | Shim et al. .................... 477/148 |

FOREIGN PATENT DOCUMENTS

| JP | 05296334 A | * 11/1993 |
| JP | 05312262 A | * 11/1993 |
| JP | A-2002-130453 | 5/2002 |
| JP | A-2006-97791 | 4/2006 |
| JP | A-2007-146906 | 6/2007 |

OTHER PUBLICATIONS

Office Action issued Mar. 1, 2011 in Japanese Patent Application No. 2009-116645 (with translation).

* cited by examiner

*Primary Examiner* — Justin Holmes
*Assistant Examiner* — Stacey Fluhart
(74) *Attorney, Agent, or Firm* — Oliff & Berridge, PLC

(57) ABSTRACT

When it is determined to perform nth to (n+1)th coast downshift during nth to (n+1)th power-off upshift, an ECU starts increasing control to increase the hydraulic pressure of an engage-side element A in a predetermined mode and maintains the hydraulic pressure of a release-side element B at a value at which the increasing control is started until a predetermined period of time elapses from when the start of the increasing control. When a turbine rotational speed does not increase even after the predetermined period of time has elapsed, as the turbine rotational speed decreases below a value lower by a predetermined value than a synchronous rotational speed in the (n+1)th gear, the ECU executes feedback control over the hydraulic pressure of the element B so that the turbine rotational speed becomes the value lower by the predetermined value than the synchronous rotational speed in the (n+1)th gear.

7 Claims, 7 Drawing Sheets

FIG.3

|      | C1 | C2 | B1 | B2 | B3 | F |
|------|----|----|----|----|----|----|
| 1ST  | ○  | ×  | ×  | ◎  | ×  | △ |
| 2ND  | ○  | ×  | ○  | ×  | ×  | × |
| 3RD  | ○  | ×  | ×  | ×  | ○  | × |
| 4TH  | ○  | ○  | ×  | ×  | ×  | × |
| 5TH  | ×  | ○  | ×  | ×  | ○  | × |
| 6TH  | ×  | ○  | ○  | ×  | ×  | × |
| R    | ×  | ×  | ×  | ○  | ○  | × |
| N    | ×  | ×  | ×  | ×  | ×  | × |

○ ENGAGED
× RELEASED
◎ ENGAGED DURING ENGINE BRAKING
△ ENGAGED ONLY DURING DRIVING

CONTROL DEVICE AND CONTROL METHOD FOR AUTOMATIC TRANSMISSION

INCORPORATION BY REFERENCE

The disclosure of Japanese Patent Application No. 2009-116645 filed on May 13, 2009 including the specification, drawings and abstract is incorporated herein by reference in its entirety.

BACKGROUND OF THE INVENTION

1. Field of the Invention

The invention relates to control for an automatic transmission and, more particularly, to control for a vehicle, which executes coast down control in an accelerator off state.

2. Description of the Related Art

An automatic transmission establishes a plurality of gears having different gear ratios by selectively engaging a plurality of frictional engagement elements, and is often used in automobiles, or the like. When a vehicle equipped with such an automatic transmission is driving, the automatic transmission undergoes shift control on the basis of a shift map that uses a vehicle speed, an accelerator pedal position, and the like, as parameters.

In the thus configured vehicle, for example, Japanese Patent Application Publication No. 2007-146906 (JP-A-2007-146906) describes shift hydraulic control at the time when a downshift due to an increase in the amount of accelerator pedal operation of a driver (power-on downshift) is performed while an upshift due to a decrease in the amount of accelerator pedal operation of the driver (power-off upshift) is being performed.

A hydraulic control device described in JP-A-2007-146906, when it is determined to perform a second shift or a power-on downshift while a first shift or a power-off upshift is being performed, immediately releases an engage-side element of the first shift and a release-side element of the second shift in accordance with the determination of the second shift, while promptly engaging an engage-side element of the second shift in accordance with the determination of the second shift, thus decreasing a turbine rotational speed by engaging the engage-side element of the second shift to proceed with a gear shift.

Incidentally, in the above described shift map, generally, upshift lines from nth gear to (n+1)th gear are set on a higher vehicle speed side than downshift lines from (n+1)th gear to nth gear. Therefore, in shift control using the shift map, there is no possibility that it is determined to perform a downshift from (n+1)th gear to nth gear immediately after start of a power-off upshift from nth gear to (n+1)th gear.

However, when the vehicle is decelerating in a state where the driver has stopped accelerator pedal operation, some vehicles execute downshift control based on a coast down point (coast down speed) different from a shift map used during normal driving (hereinafter, also referred to as "coast down shift control" or "deceleration downshift control"). The coast down speeds are generally set on a higher vehicle speed side than the speeds of downshift lines in an accelerator off state in the shift map. Therefore, as the driver depresses a brake pedal to decelerate the vehicle immediately after the driver stops accelerator pedal operation, a downshift from (n+1)th gear to nth gear based on coast down control (hereinafter, also referred to as "coast downshift" or "deceleration downshift") is performed immediately after start of a power-off upshift from nth gear to (n+1)th gear based on the shift map.

In this way, when a power-off upshift in execution is stopped and then a deceleration downshift is performed, hydraulic control may not be normally continued to cause an unnecessary decrease in engine rotational speed (turbine rotational speed) depending on the timing at which a deceleration downshift is executed. This makes the driver feel uncomfortable. However, JP-A-2007-146906 does not describe any information about shift hydraulic control at the time when a deceleration downshift is performed during a power-off upshift.

SUMMARY OF THE INVENTION

The invention provides a control device and a control method that are able to suppress a decrease in the rotational speed of an input shaft of an automatic transmission when a deceleration downshift from a second gear ratio to a first gear ratio is performed during a power-off upshift from the first gear ratio to the second gear ratio.

A first aspect of the invention provides a control device. The control device controls an automatic transmission having a plurality of hydraulic frictional engagement elements including a first element and a second element. The control device includes: a first shift unit that performs a first shift for upshifting from a first gear ratio to a second gear ratio that is higher in speed than the first gear ratio by executing control for releasing the first element and control for engaging the second element; and a second shift unit that performs a second shift for downshifting from the second gear ratio to the first gear ratio by executing control for engaging the first element and control for releasing the second element. The automatic transmission is configured to, during the second shift, enter a state where no power is transmitted between an input shaft and output shaft of the automatic transmission in a state where the first element is released and the second element is released, and enter a state where power is transmitted between the input shaft and output shaft of the automatic transmission in a state where any one of the first element and the second element is engaged. The second shift unit, when the first shift in execution is stopped to perform the second shift, executes control for engaging the first element and executes suppressing control for controlling the second element so as to suppress a decrease in rotational speed of the input shaft of the automatic transmission until the rotational speed of the input shaft starts to increase as the control for engaging the first element progresses, and executes control for releasing the second element after the rotational speed of the input shaft has started to increase.

The suppressing control may be a control for executing feedback control over a hydraulic pressure of the second element so that the rotational speed of the input shaft is equal to a reference rotational speed.

The suppressing control may maintain a hydraulic pressure of the second element at the time when control for engaging the first element is started until a predetermined period of time elapses from when the control for engaging the first element is started, when the rotational speed of the input shaft does not increase at the time when the predetermined period of time has elapsed, the suppressing control may maintain the hydraulic pressure of the second element until the rotational speed of the input shaft decreases below a predetermined rotational speed, and the suppressing control may execute feedback control over the hydraulic pressure of the second element so that the rotational speed of the input shaft is equal to a reference rotational speed after the rotational speed of the input shaft has decreased below the predetermined rotational speed.

The reference rotational speed may be set at a value that is lower by a predetermined value than the rotational speed of the input shaft on the assumption that the second gear ratio, which is a gear ratio after the first shift, is established.

An internal combustion engine may be connected to the input shaft of the automatic transmission, the internal combustion engine may be allowed to execute fuel cut control within a range in which a rotational speed of the internal combustion engine is higher than a predetermined threshold, and the reference rotational speed may be set at a value that is higher than the predetermined threshold.

The automatic transmission may be mounted on a vehicle, the first shift may be a power-off upshift that causes the automatic transmission to upshift as the amount of an accelerator pedal operation of a driver of the vehicle decreases, and the second shift may be a deceleration downshift that causes the automatic transmission to downshift as the vehicle decelerates in a state where the driver of the vehicle is not operating the accelerator pedal.

A second aspect of the invention provides a control method executed by a control device for an automatic transmission having a plurality of hydraulic frictional engagement elements including a first element and a second element. The control method includes: a step of performing a first shift for upshifting from a first gear ratio to a second gear ratio that is higher in speed than the first gear ratio by executing control for releasing the first element and control for engaging the second element; and a step of performing a second shift for downshifting from the second gear ratio to the first gear ratio by executing control for engaging the first element and control for releasing the second element. The automatic transmission is configured to, during the second shift, enter a state where no power is transmitted between an input shaft and output shaft of the automatic transmission in a state where the first element is released and the second element is released, and enter a state where power is transmitted between the input shaft and output shaft of the automatic transmission in a state where any one of the first element and the second element is engaged. The step of performing the second shift includes a step of, when the first shift in execution is stopped to perform the second shift, executing control for engaging the first element and executing suppressing control for controlling the second element so as to suppress a decrease in rotational speed of the input shaft of the automatic transmission until the rotational speed of the input shaft starts to increase as the control for engaging the first element progresses, and executing control for releasing the second element after the rotational speed of the input shaft has started to increase.

According to the aspects of the invention, when an upshift (power-off upshift) from the first gear ratio to the second gear ratio in execution is stopped to perform a downshift (deceleration downshift) from the second gear ratio to the first gear ratio, it is possible to suppress an unnecessary decrease in the rotational speed of the input shaft of the automatic transmission.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIG. 3 is a view that shows the operation table of the automatic transmission;

DETAILED DESCRIPTION OF EMBODIMENTS

Figure 1:
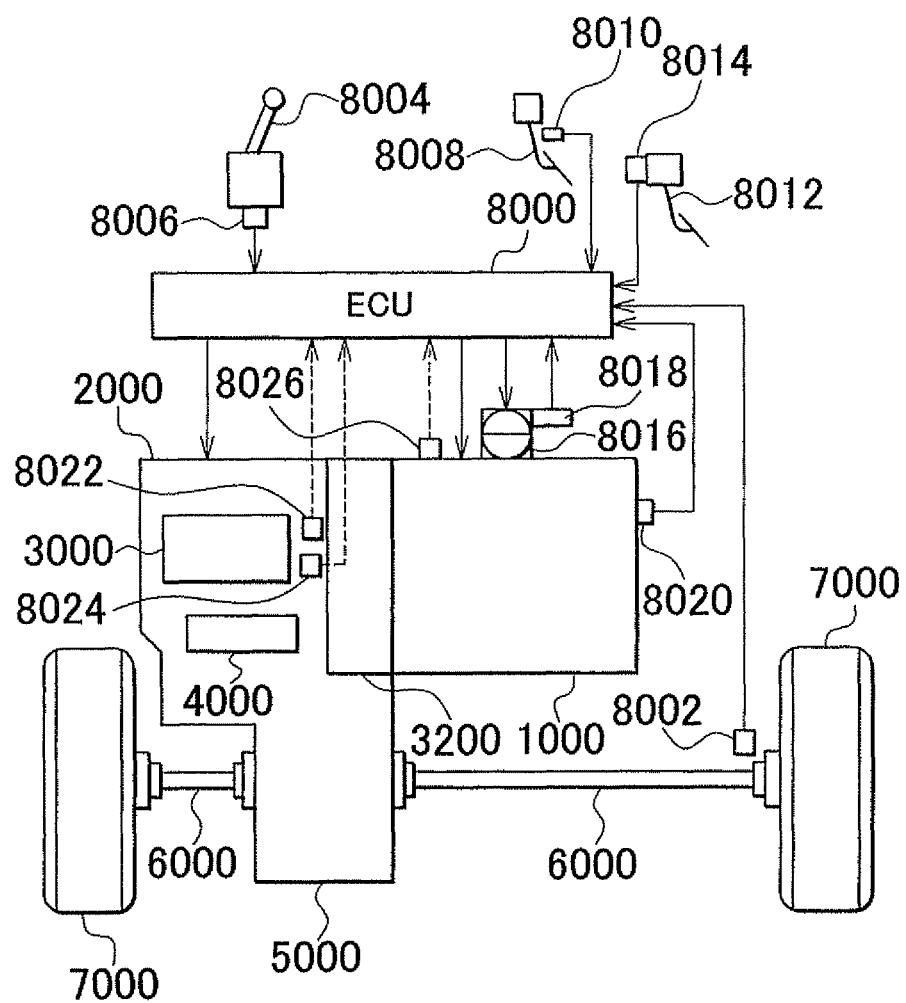
FIG. 1 is a view that shows the structure of a vehicle on which an ECU is mounted.

Hereinafter, an embodiment of the invention will be described with reference to the accompanying drawings. In the following description, like reference numerals denote the same components. Those same components have the same names and functions. Therefore, the detailed description thereof will not be repeated.

A vehicle equipped with a control device according to the embodiment of the invention will be described with reference to FIG. 1. The vehicle is an front-engine front-drive (FF) vehicle equipped with a six-speed stepped automatic transmission. Note that the vehicle to which the control device according to the aspect of the invention may be applied is not specifically limited as long as a vehicle is equipped with an automatic transmission. For example, the control device according to the aspect of the invention may be applied to a vehicle other than the FF vehicle or a vehicle equipped with an automatic transmission other than the six-speed automatic transmission.

The vehicle includes an engine 1000, an automatic transmission 2000, a planetary gear unit 3000, a hydraulic circuit 4000, a differential gear 5000, drive shafts 6000, front wheels 7000 and an electronic control unit (ECU) 8000. The planetary gear unit 3000 constitutes part of the automatic transmission 2000. The hydraulic circuit 4000 constitutes part of the automatic transmission 2000.

The engine 1000 is an internal combustion engine that combusts a mixture of air and fuel injected from an injector (not shown) inside a combustion chamber of a cylinder. A piston in the cylinder is pushed down by combustion to rotate a crankshaft.

The automatic transmission 2000 is coupled to the engine 1000 via a torque converter 3200. The automatic transmission 2000 establishes a desired gear to thereby shift the rotational speed of the crankshaft into a desired rotational speed.

The output gear of the automatic transmission 2000 is in mesh with the differential gear 5000. The drive shafts 6000 are coupled to the differential gear 5000 by spline fitting, or the like. Power is transmitted to the left and right front wheels 7000 via the respective drive shafts 6000.

A vehicle speed sensor 8002, a position switch 8006 of a shift lever 8004, an accelerator pedal position sensor 8010 of an accelerator pedal 8008, a stroke sensor 8014 of a brake pedal 8012, a throttle opening degree sensor 8018 of an electronic throttle valve 8016, an engine rotational speed sensor 8020, an input shaft rotational speed sensor 8022, an output shaft rotational speed sensor 8024 and a coolant temperature sensor 8026 are connected to the ECU 8000 via a harness, or the like.

The vehicle speed sensor 8002 detects the vehicle speed V on the basis of the rotational speed of each drive shaft 6000. The position switch 8006 detects the position of the shift lever 8004. The accelerator pedal position sensor 8010 detects the position (accelerator pedal position) ACC of the accelerator pedal 8008. The stroke sensor 8014 detects the stroke of the brake pedal 8012. The throttle opening degree sensor 8018 detects the opening degree of the electronic throttle valve 8016 of which the opening degree is regulated by an actuator. The engine rotational speed sensor 8020 detects the engine rotational speed NE. The input shaft rotational speed sensor 8022 detects the input shaft rotational speed NIN of the automatic transmission 2000 (turbine rotational speed NT of the torque converter 3200). The output shaft rotational speed sensor 8024 detects the output shaft rotational speed NOUT of the automatic transmission 2000. The coolant temperature sensor 8026 detects the temperature of coolant (coolant temperature) of the engine 1000. These sensors transmit the detected results to the ECU 8000.

The ECU 8000 controls the engine 1000 and equipment, such as the automatic transmission 2000, so that the vehicle becomes a desired state on the basis of signals transmitted from the sensors and the maps and programs stored in a read only memory (ROM).

In the present embodiment, when a predetermined fuel cut start condition is satisfied in order to improve fuel economy, the ECU 8000 starts control for stopping supply of fuel to the engine 1000 (fuel cut control). In addition, as a predetermined fuel cut return condition is satisfied during fuel cut control, the ECU 8000 stops fuel cut control and resumes supply of fuel to the engine 1000.

Note that, in the present embodiment, the fuel cut start condition includes a condition that the engine rotational speed NE is higher than a predetermined fuel cut start rotational speed N1 and the driver is not operating the accelerator pedal (the accelerator pedal operation amount is 0). In addition, the fuel cut return condition includes a condition that the engine rotational speed NE has decreased below a predetermined fuel cut return rotational speed N2 (<N1) or the driver has operated the accelerator pedal.

In addition, when the shift lever 8004 is in D (drive) position, the ECU 8000 controls the automatic transmission 2000 so that any one of first to sixth gears (gear ratios) is established. When any one of the first to sixth gears is established, the automatic transmission 2000 is able to transmit driving force to the front wheels 7000. Note that the gears are not limited to the first to sixth gears.

Figure 2:
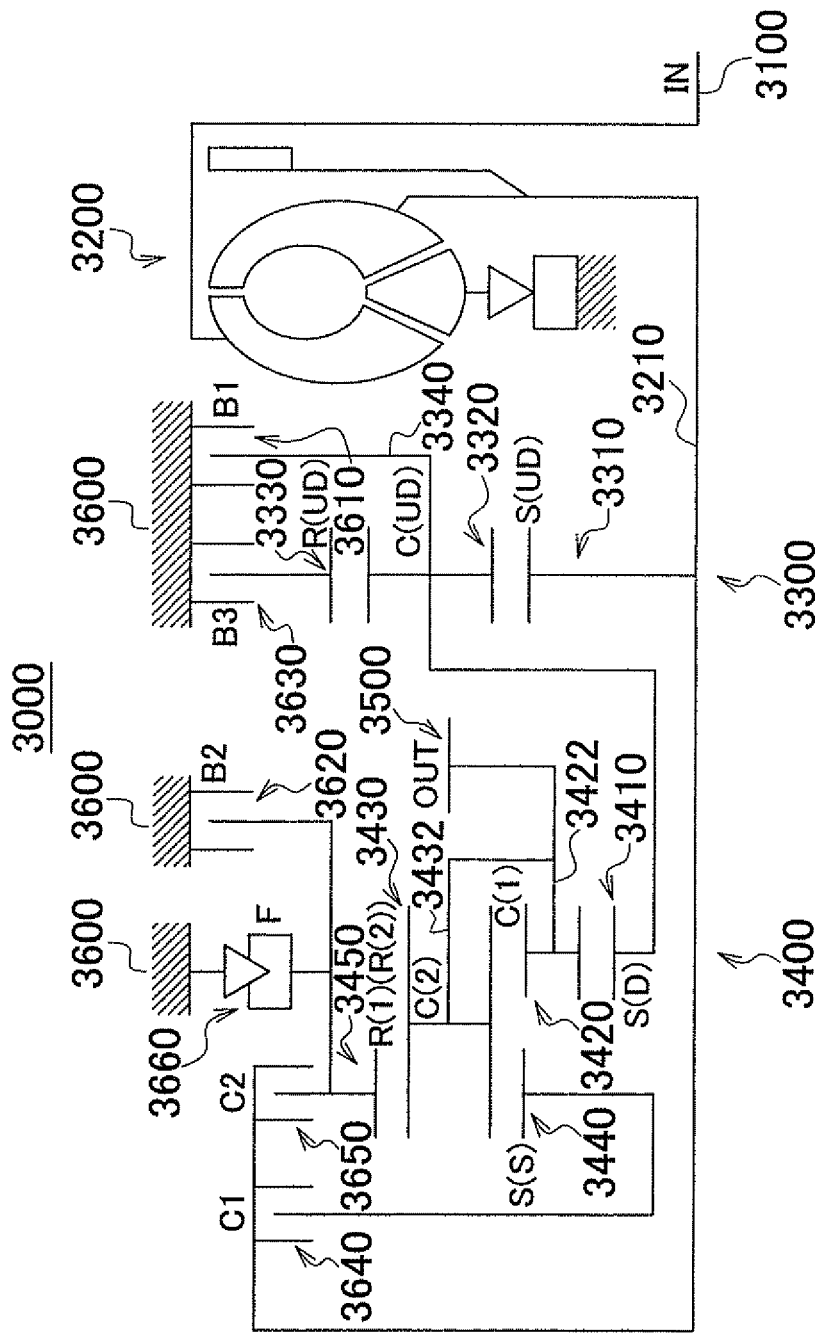
FIG. 2 is a skeleton view that shows a gear train in an automatic transmission.

The planetary gear unit 3000 will be described with reference to FIG. 2. The planetary gear unit 3000 is connected to the torque converter 3200 that has an input shaft 3100 coupled to the crankshaft. The planetary gear unit 3000 includes a first set 3300 formed of a planetary gear mechanism, a second set 3400 formed of a planetary gear mechanism, an output gear 3500, a B1 brake 3610, a B2 brake 3620 and a B3 brake 3630, a C1 clutch 3640, a C2 clutch 3650, and a one-way clutch F 3660. The B1 brake 3610, the B2 brake 3620 and the B3 brake 3630 are fixed to a gear case 3600.

The first set 3300 is a single pinion type planetary gear mechanism. The first set 3300 includes a sun gear S(UD) 3310, pinion gears 3320, a ring gear R(UD) 3330 and a carrier C(UD) 3340.

The sun gear S(UD) 3310 is coupled to an output shaft 3210 of the torque converter 3200. The pinion gears 3320 are rotatably supported by the carrier C(UD) 3340. The pinion gears 3320 are in mesh with the sun gear S(UD) 3310 and the ring gear R(UD) 3330.

The ring gear R(UD) 3330 is fixed to the gear case 3600 by the B3 brake 3630. The carrier C(UD) 3340 is fixed to the gear case 3600 by the B1 brake 3610.

The second set 3400 is a Ravigneaux planetary gear mechanism. The second set 3400 includes a sun gear S(D) 3410, short pinion gears 3420, a carrier C(1) 3422, long pinion gears 3430, a carrier C(2) 3432, a sun gear S(S) 3440 and a ring gear R(1) (R(2)) 3450.

The sun gear S(D) 3410 is coupled to the carrier C(UD) 3340. The short pinion gears 3420 are rotatably supported by the carrier C(1) 3422. The short pinion gears 3420 are in mesh with the sun gear S(D) 3410 and the long pinion gears 3430. The carrier C(1) 3422 is coupled to the output gear 3500.

The long pinion gears 3430 are rotatably supported by the carrier C(2) 3432. The long pinion gears 3430 are in mesh with the short pinion gears 3420, the sun gear S(S) 3440 and the ring gear R(1) (R(2)) 3450. The carrier C(2) 3432 is coupled to the output gear 3500.

The sun gear S(S) 3440 is coupled to the output shaft 3210 of the torque converter 3200 by the C1 clutch 3640. The ring gear R(1) (R(2)) 3450 is fixed to the gear case 3600 by the B2 brake 3620, and is coupled to the output shaft 3210 of the torque converter 3200 by the C2 clutch 3650. In addition, the ring gear R(1) (R(2)) 3450 is coupled to the one-way clutch F 3660, and is not rotatable when driven in the first gear.

The one-way clutch F 3660 is provided in parallel with the B2 brake 3620. That is, the outer race of the one-way clutch F 3660 is fixed to the gear case 3600, and the inner race of the one-way clutch F 3660 is coupled to the ring gear R(1) (R(2)) 3450 via a rotating shaft.

FIG. 3 is an operation table that shows the relationship between each gear and the operating states of the clutches and brakes. The circle represents an engaged state. The cross represents a released state. The double circle represents an engaged state only during engine braking. The triangle represents an engaged state only during driving. The brakes and clutches are operated in combinations shown in the operation table to establish the first to sixth forward gears and the reverse gear. The clutches and the brakes operate in such a manner that the hydraulic circuit 4000 controls engagement hydraulic pressures of the clutches and brakes.

During normal driving, the ECU 8000 outputs a shift instruction for operating the clutches and the brakes to the hydraulic circuit 4000 on the basis of the gear determined on the basis of the vehicle speed V, the accelerator pedal position ACC and the shift map, which will be described later, and a combination shown in the operation table of FIG. 3.

For example, when the automatic transmission 2000 upshifts from the second gear to the third gear, the ECU 8000 outputs an instruction to the hydraulic circuit 4000 so as to decrease the hydraulic pressure supplied to the B1 brake 3610 (B1 pressure) to release the B1 brake 3610 and increase the hydraulic pressure supplied to the B3 brake 3630 (I33 pressure) to engage the B3 brake 3630 while maintaining the C1 clutch 3640 in an engaged state.

In addition, when the automatic transmission 2000 downshifts from the third gear to the second gear, the ECU 8000 outputs an instruction to the hydraulic circuit 4000 so as to decrease the B3 pressure to release the B3 brake 3630 and increase the B1 pressure to engage the B1 brake 3610.

The shift map used to determine a gear will be described with reference to FIG. 4. Note that FIG. 4 shows an example of a map applied to shifts among the first to third gears.

Figure 4:
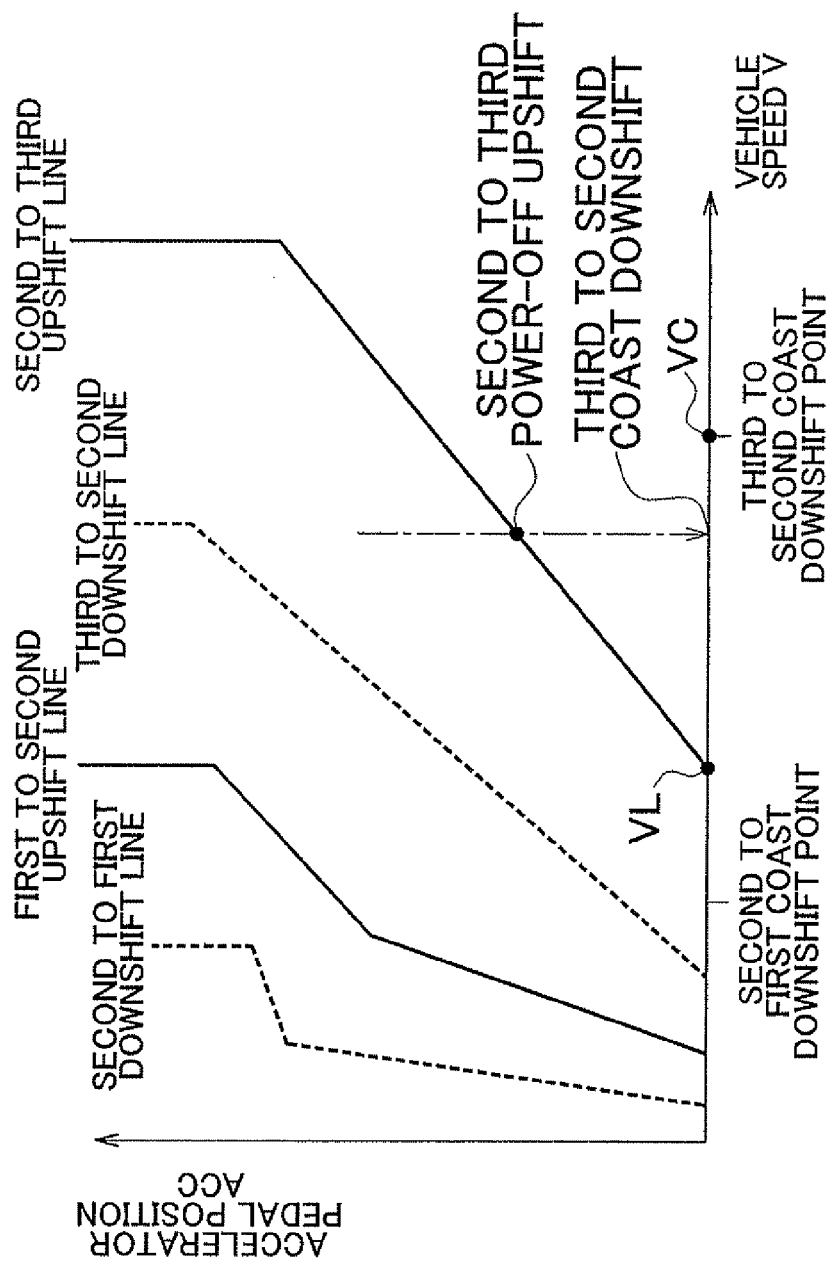
FIG. 4 is a shift map that shows shift conditions of the automatic transmission.

As shown in FIG. 4, the shift map includes shift lines (upshift lines and downshift lines) that use the vehicle speed V and the accelerator pedal position ACC as parameters. In order to suppress shift hunting, the upshift lines are respectively set on a higher vehicle speed side than the downshift lines.

During normal driving, the ECU 8000 executes shift control on the basis of the shift lines. For example, in a state where the gear is the second gear, as the accelerator pedal operation amount of the driver decreases and, as a result, crosses the second to third upshift line, the ECU 8000 starts an upshift to the third gear (power-off upshift).

On the other hand, when a predetermined decelerating condition that includes a condition that the vehicle is decelerating in a state where the accelerator pedal operation amount is 0 (state of ACC=0 in FIG. 4) is satisfied, the ECU 8000 executes coast down shift control based on a coast down point (coast down speed) different from the downshift line (deceleration downshift control).

The coast down point is set on a higher vehicle speed side than a point of the downshift line in an accelerator off state in order to prevent occurrence of shift shock or noise by suppressing a variation in input torque from the torque converter 3200 during downshift. For this reason, in the shift map shown in FIG. 4, the third to second coast down speed VC is higher than the speed VL of the second to third upshift line in an accelerator off state.

Therefore, for example, when the driver changes a step from the accelerator pedal 8008 onto the brake pedal 8012, it may be determined that a coast downshift from the (n+1)th gear to the nth gear is performed immediately after a power-off upshift from the nth gear to the (n+1)th gear (n is any one of 1, 2, 3, 4 and 5 in the present embodiment) has been started. For example, as indicated by the alternate long and short dashed line in FIG. 4, as the accelerator pedal position ACC varies, immediately after the second to third power-off upshift has been started, it is determined to perform the third to second coast downshift.

In a state where it is determined to perform coast downshift immediately after the start of a power-off upshift, if the power-off upshift in execution is stopped to start coast downshift, there is a concern about a decrease in engine rotational speed NE.

That is, immediately after the power-off upshift from the nth gear to the (n+1)th gear has been started, the hydraulic pressure applied to the engage-side element (this element will be the release-side element in the next coast downshift) in the power-off upshift is extremely low. In order to start downshifting from the (n+1)th gear to the nth gear from the above state, a coast downshift is started in a state where the engage-side element (the release-side element in the next coast downshift) in the power-off upshift has no torque capacity. Thus, if the hydraulic pressure of the release-side element in the coast downshift is drained immediately after the coast downshift has been started, the automatic transmission 2000 is in a state substantially equivalent to neutral (state where no power is transmitted between the input shaft and output shaft of the automatic transmission 2000) until the engage-side element in the coast downshift begins to have a torque capacity. Therefore, there is a concern about a decrease in engine rotational speed NE to about an idle rotational speed.

Particularly, when the driver changes a step from the accelerator pedal 8008 onto the brake pedal 8012, fuel cut control is executed when the engine rotational speed NE is higher than the fuel cut start rotational speed N1; however, if the engine rotational speed NE decreases below the fuel cut return rotational speed N2 because of a coast downshift during a power-off upshift, fuel cut control is unnecessarily stopped.

To suppress these issues, in the present embodiment, when the power-off upshift in execution is stopped to start a coast downshift, the hydraulic pressure of an engage-side element undergoes increasing control (engagement control) to be increased in a predetermined mode, while the hydraulic pressure of a release-side element is controlled not to immediately decrease but to temporarily suppress a decrease in engine rotational speed.

Figure 5:
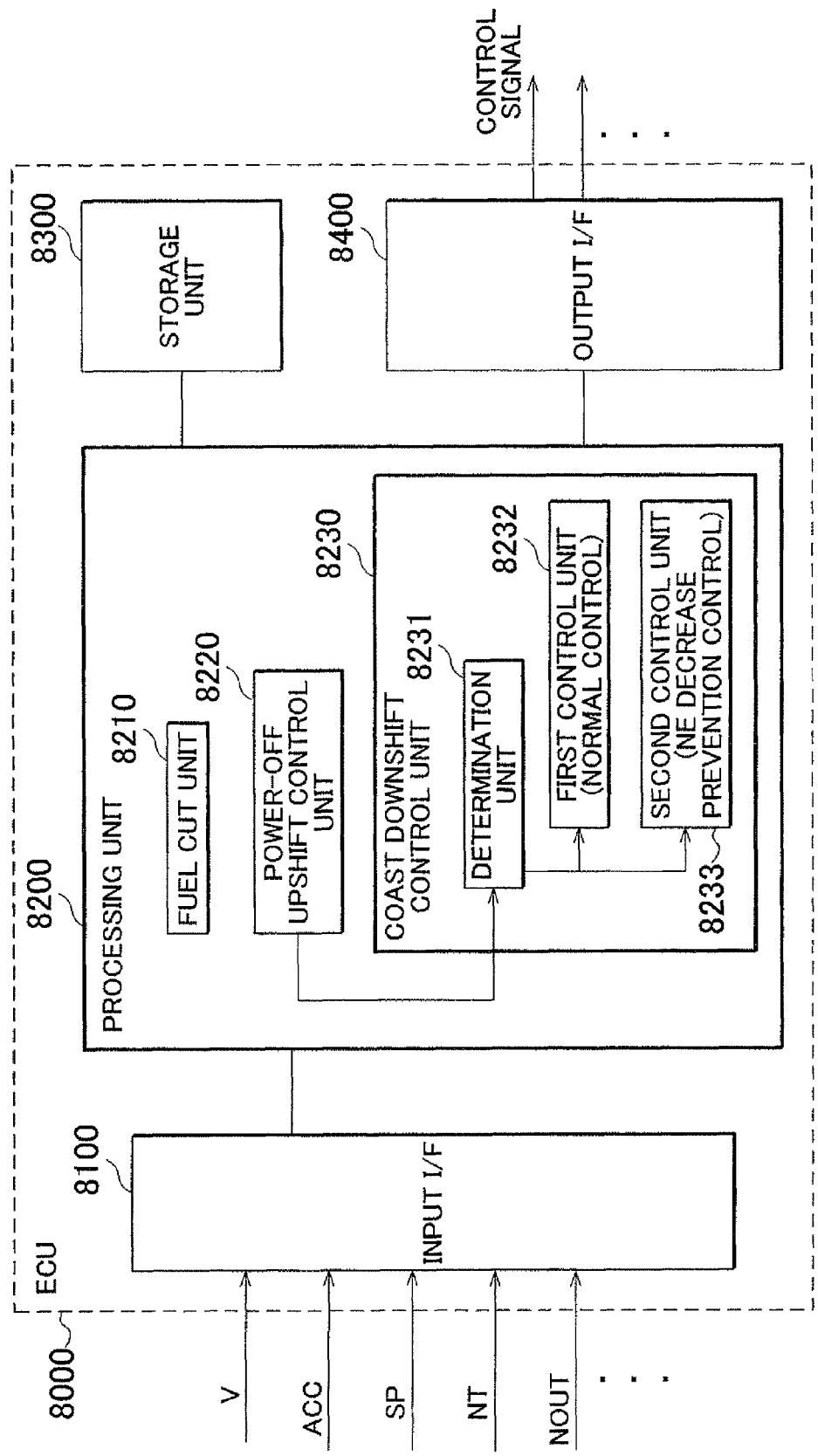
FIG. 5 is a functional block diagram of the ECU.

FIG. 5 shows the functional block diagram of the ECU 8000. The ECU 8000 includes an input interface 8100, a storage unit 8300, a processing unit 8200, and an output interface 8400. The input interface 8100 receives information from various sensors, or the like. The storage unit 8300 stores various pieces of information, programs, thresholds, maps, and the like. The processing unit 8200 loads or stores data in the storage unit 8300 where necessary. The processing unit 8200 performs processing on the basis of information from the input interface 8100 and the storage unit 8300. The output interface 8400 outputs the processing results of the processing unit 8200 to various equipment.

The processing unit 8200 includes a fuel cut unit 8210, a power-off upshift control unit 8220 and a coast downshift control unit 8230.

The fuel cut unit 8210 executes the above described fuel cut control. That is, the fuel cut unit 8210 stops supply of fuel to the engine 1000 when the fuel cut start condition is satisfied, and stops fuel cut control to resume supply of fuel to the engine 1000 when the fuel cut return condition is satisfied during fuel cut control.

Note that the fuel cut return condition includes a condition that the engine rotational speed NE has decreased below the fuel cut return rotational speed N2 (<N1).

That is, when the engine rotational speed NE (≈turbine rotational speed NT) has decreased below the fuel cut return rotational speed N2 during fuel cut control, the fuel cut control is stopped to resume supply of fuel to the engine 1000.

The power-off upshift control unit 8220 executes the nth to (n+1)th power-off upshift control when the accelerator pedal operation amount of the driver decreases to cross the nth to (n+1)th upshift line. Specifically, when, in the nth to (n+1)th power-off upshift, a frictional engagement element to be released is an element A and a frictional engagement element to be engaged is an element B, the power-off upshift control unit 8220 executes control for decreasing the hydraulic pressure of the element A in a predetermined mode so as to release the element A, while executing control for increasing the hydraulic pressure of the element B in a predetermined mode so as to engage the element B.

Note that the above described element A is a frictional engagement element to be engaged in the (n+1)th to nth coast downshift. In addition, the above described element B is a frictional engagement element to be released in the (n+1)th to nth coast downshift.

In a state where the predetermined decelerating condition that includes a condition that the vehicle is decelerating while the accelerator pedal operation amount is 0 is satisfied, when the current vehicle speed V has decreased below the (n+1)th to nth coast downshift speed, the coast downshift control unit 8230 determines to perform the (n+1)th to nth coast downshift and then executes (n+1)th to nth coast downshift control.

The coast downshift control unit 8230 includes a determination unit 8231, a first control unit 8232 and a second control unit 8233.

The determination unit 8231 determines whether it is determined to perform the (n+1)th to nth coast downshift during the nth to (n+1)th power-off upshift. When it is determined to perform the (n+1)th to nth coast downshift after the nth to (n+1)th power-off upshift, the first control unit 8232 executes the (n+1)th to nth coast downshift control. On the other hand, when it is determined to perform the (n+1)th to nth coast downshift during the nth to (n+1)th power-off upshift, the second control unit 8232 executes the (n+1)th to nth coast downshift control.

The first control unit 8232 executes the (n+1)th to nth coast downshift by normal control. Specifically, the first control unit 8232 executes increasing control to increase the hydraulic pressure of the engage-side element A in a predetermined mode (control for engaging the element A), and executes decreasing control to decrease the hydraulic pressure of the release-side element B in a predetermined mode (control for releasing the element B).

The second control unit 8233 executes the (n+1)th to nth coast downshift by control (NE decrease prevention control) different from the normal control.

Specifically, the second control unit 8233 executes increasing control to increase the hydraulic pressure of the engage-side element A in a predetermined mode as in the case of the normal control; however, the hydraulic pressure of the release-side element B is maintained at a value, at which increasing control over the hydraulic pressure of the element A is started, until a predetermined period of time elapses from when increasing control over the hydraulic pressure of the element A is started. Then, when the turbine rotational speed NT does not increase even when a predetermined period of time has elapsed, the hydraulic pressure of the element B is maintained until the turbine rotational speed NT decreases below a predetermined rotational speed. After the turbine rotational speed has decreased below the predetermined rotational speed, the hydraulic pressure of the element B is controlled in a feedback manner so that the turbine rotational speed NT becomes a reference rotational speed. Thereafter, after the turbine rotational speed NT has started to increase, release control for decreasing the hydraulic pressure of the element B in a predetermined mode is executed.

In the present embodiment, the above described predetermined rotational speed and reference rotational speed are set at a value ($=NT(n+1)-\beta$) that is lower by a predetermined value $\beta$ than a synchronous rotational speed $NT(n+1)$ in the (n+1)th gear.

Note that the above described predetermined rotational speed need not necessarily be the same value as the reference rotational speed. For example, the predetermined rotational speed may be set at $NT(n+1)$. By so setting, feedback control is started at the time when $NT<NT(n+1)$.

In addition, the reference rotational speed ($=NT(n+1)-\beta$) is at least set at a value higher than the fuel cut return rotational speed N2.

The above described functions may be implemented by software or may be implemented by hardware.

Figure 6:
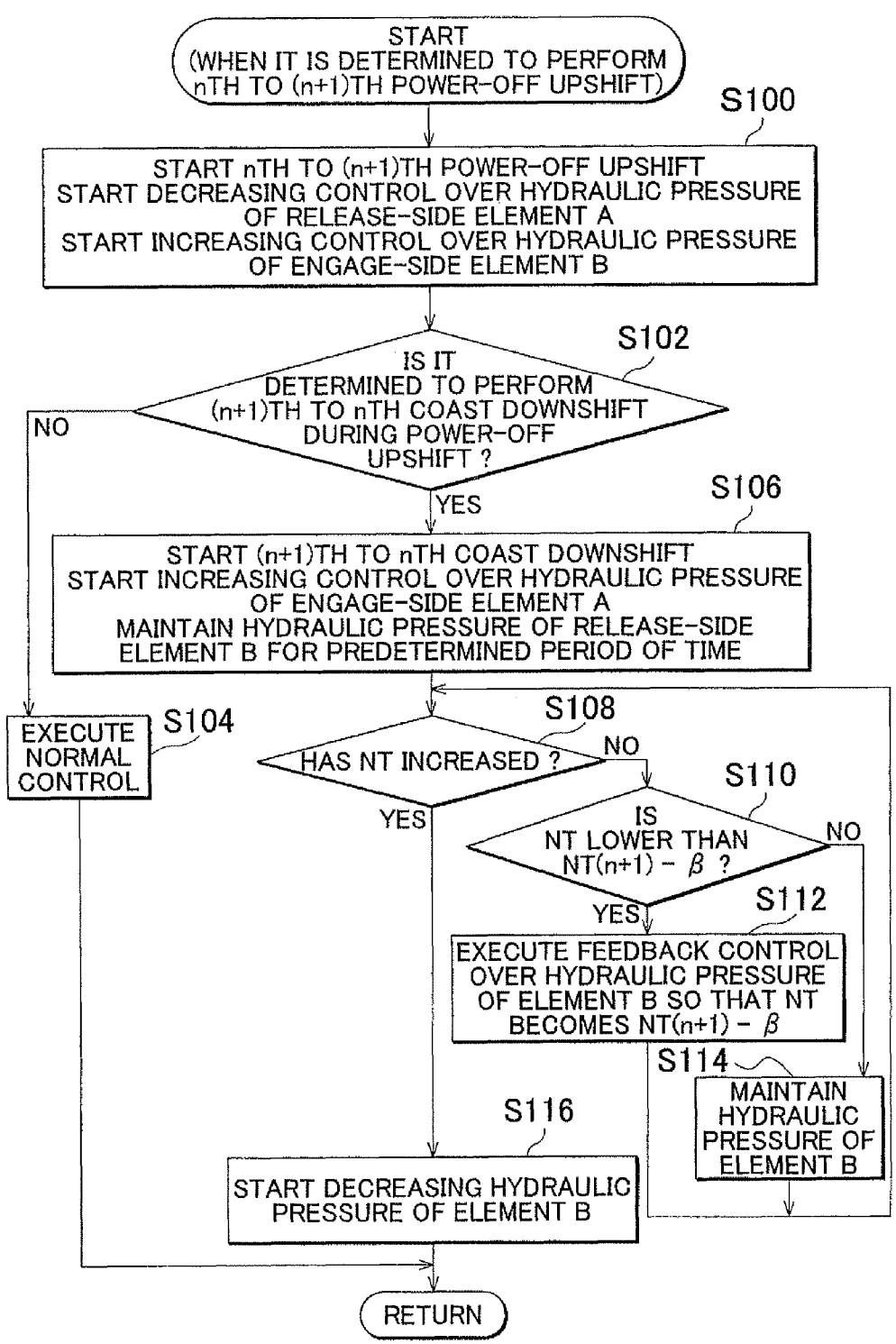
FIG. 6 is a flowchart that shows the control structure of the ECU.

FIG. 6 is a process flow of the ECU 8000 when the functions of the above described power-off upshift control unit 8220 and coast downshift control unit 8230 are implemented by software. Note that the above process is executed when the accelerator pedal operation amount of the driver decreases to cross the nth to (n+1)th upshift line and then it is determined to perform the nth to (n+1)th power-off upshift.

As shown in FIG. 6, in step (hereinafter, step is abbreviated as S) 100, the ECU 8000 starts the nth to (n+1)th power-off upshift. That is, the ECU 8000 starts control for decreasing the hydraulic pressure of the release-side element A in the nth to (n+1)th power-off upshift in a predetermined mode, and starts control for increasing the hydraulic pressure of the engage-side element B in the nth to (n+1)th power-off upshift in a predetermined mode.

In S102, the ECU 8000 determines whether it is determined to perform the (n+1)th to nth coast downshift during the nth to (n+1)th power-off upshift. When affirmative determination is made in this process (YES in S102), the process proceeds to S106. Otherwise (NO in S102), the process proceeds to S104, and the above described normal control is executed.

In S106, the ECU 8000 starts the (n+1)th to nth coast downshift by NE decrease prevention control. That is, the ECU 8000 starts increasing control to increase the hydraulic pressure of the engage-side element A in the (n+1)th to nth coast downshift in a predetermined mode, and maintains the hydraulic pressure of the release-side element B at a value at which the increasing control over the hydraulic pressure of the element A is started until a predetermined period of time elapses from when the increasing control over the hydraulic pressure of the element A is started. Note that the ECU 8000 stops the nth to (n+1)th power-off upshift in execution because of start of the (n+1)th to nth coast downshift.

In S108, the ECU 8000 determines whether the turbine rotational speed NT has increased. For example, the ECU 8000 detects the turbine rotational speed NT at a predetermined cycle, and, when a cycle in which the current turbine rotational speed NT is higher than the previous turbine rotational speed successively occurs a predetermined number of times, the ECU 8000 determines that the turbine rotational speed has increased. When affirmative determination is made in this process (YES in S108), the process proceeds to S116. Otherwise (NO in S108), the process proceeds to S110.

In S110, the ECU 8000 determines whether the current turbine rotational speed NT has decreased below a value lower by a predetermined value $\beta$ than the synchronous rotational speed $NT(n+1)$ in the (n+1)th gear (that is, whether $NT<NT(n+1)-\beta$). Note that the synchronous rotational speed $NT(n+1)$ is a turbine rotational speed NT on the assumption that the (n+1)th gear, which is a gear after the nth to (n+1)th power-off upshift, is established. The ECU 8000 calculates the synchronous rotational speed $NT(n+1)$ on the basis of the output shaft rotational speed NOUT and the gear ratio of the (n+1)th gear. Note that the ECU 8000 sets $NT(n+1)-\beta$ at a value that is at least higher than the fuel cut return rotational speed N2. When affirmative determination is made in this process (YES in S110), the process proceeds to S112. Otherwise (NO in S110), the process proceeds to S114.

In S112, the ECU 8000 executes feedback control over the hydraulic pressure of the release-side element B so that the turbine rotational speed NT is equal to $NT(n+1)-\beta$. After that, the process returns to S108.

In S114, the ECU 8000 maintains the hydraulic pressure of the element B. After that, the process returns to S108.

In S116, the ECU 8000 executes decreasing control to decrease the hydraulic pressure of the element B at a predetermined rate.

Hydraulic pressure control of the ECU 8000 based on the above described structure and flowchart will be described with reference to FIG. 7.

Figure 7:
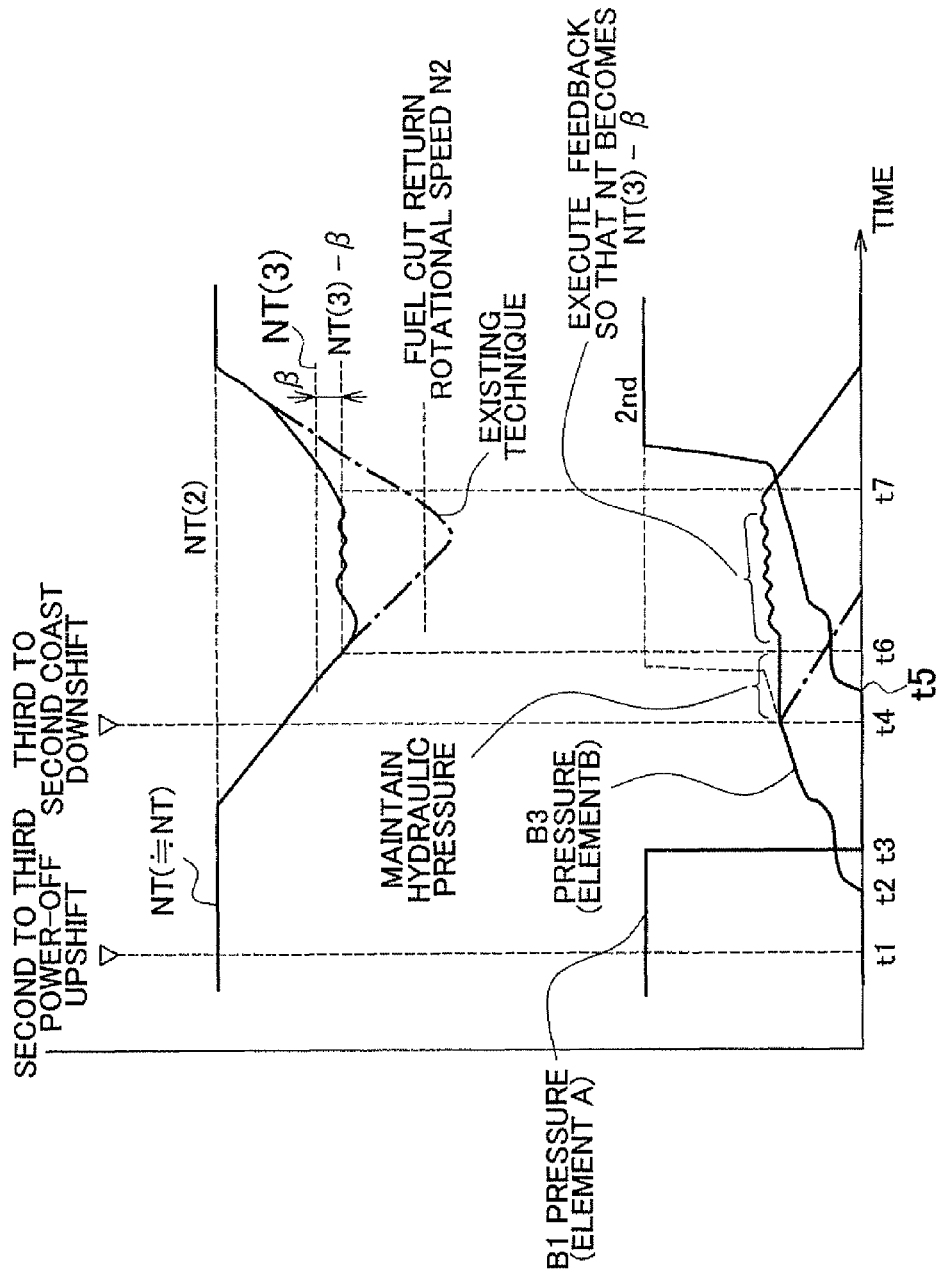
FIG. 7 is a view that shows hydraulic pressures controlled by the ECU.

FIG. 7 shows B1 pressure and B3 pressure when it is determined to perform second to third power-off upshift at time t1 in accordance with the fact that the driver has changed a step from the accelerator pedal 8008 onto the brake pedal 8012, and it is determined to perform third to second coast downshift at time t4 at which the second to third power-off upshift has not been completed. Note that in FIG. 7, the B1 pressure corresponds to the hydraulic pressure of the element A (the release-side element in the power-off upshift or the engage-side element in the coast downshift) shown in the flowchart in FIG. 6, and the B3 pressure corresponds to the hydraulic pressure of the element B (the engage-side element in the power-off upshift or the release-side element in the coast downshift) shown in the flowchart in FIG. 6.

In this case, the second to third power-off upshift is executed until time t4 (S100). That is, an increase in B3 pressure is started at time t2, and the B1 pressure is decreased to 0 at time t3.

When it is determined to perform the third to second coast downshift at time t4 at which the second to third power-off upshift has not been completed, in the related art, as indicated by the alternate long and short dashed line in FIG. 7, the B3 pressure is started to decrease at time t4. This causes a decrease (undershoot) in turbine rotational speed NT to problematically make the driver feel uncomfortable or stop fuel cut.

That is, in the related art, although the B3 pressure is still increasing and the hydraulic pressure level is extremely low at time t4, a decrease in B3 pressure is started at time t4, so the torque capacity of the B3 brake 3630 is approximately 0 immediately after time t4. Therefore, until time t7 at which the B1 brake 3610 starts to be engaged as the increasing control of the B1 pressure progresses, the automatic transmission 2000 is in a state substantially equivalent to neutral. In such a state and in an accelerator off state, the turbine rotational speed NT ($\approx$engine rotational speed NE) has been decreased nearly to an idle rotational speed. Because of the decrease in engine rotational speed NE, a large negative torque is generated when the second gear is established through the third to second coast downshift. This makes the driver feel uncomfortable. In addition, this causes the engine rotational speed NE to decrease below the fuel cut return rotational speed N2 to unnecessarily stop fuel cut control.

In order to solve these problems, in the present embodiment, when it is determined to perform third to second coast downshift at time t4 (YES in S102), increasing control over the B1 pressure is started, and the B3 pressure is maintained at a value, at which the increasing control over the B1 pressure is started, until time t6 at which a predetermined period of time has elapsed from when the increasing control over the B1 pressure is started (S106).

Then, at time t6, NT does not increase but decreases below a third synchronous rotational speed NT(3)–$\beta$ (NO in S108, and YES in S110), so the B3 pressure is controlled in a feedback manner so that NT is equal to NT(3)–$\beta$ (S112).

In this way, the torque capacity of the B3 brake 3630 is somewhat ensured by temporarily maintaining the B3 pressure or executing feedback control so that NT is equal to NT(3)–$\beta$, so this prevents a situation that the automatic transmission 2000 becomes a state equivalent to neutral. Therefore, a decrease in turbine rotational speed NT as in the case of the related art is suppressed. In addition, by executing feedback control over the B3 pressure so that NT is equal to not NT(3) but a value that is lower by $\beta$ than NT(3), it is possible to suppress the B3 pressure, which needs to be ultimately decreased, as small as possible.

After that, when the increasing control over the B1 pressure progresses and then the B1 brake 3610 begins to be engaged to cause the turbine rotational speed NT to start to increase at time t7 (YES in S108), the B3 pressure is decreased at a predetermined rate, and the B3 brake 3630 is released (S116). By so doing, a coast downshift to the second gear progresses.

As described above, when the ECU according to the present embodiment stops a power-off upshift in execution to start a coast downshift, the ECU executes increasing control to increase the hydraulic pressure of an engage-side element in a predetermined mode, and maintains the hydraulic pressure of a release-side element until a predetermined period of time elapses from when the increasing control over the hydraulic pressure of the engage-side element is started. Then, when the turbine rotational speed does not increase after the predetermined period of time has elapsed, the hydraulic pressure of the release-side element is maintained until the turbine rotational speed decreases below a predetermined rotational speed, and, after the turbine rotational speed has decreased below the predetermined rotational speed, the hydraulic pressure of the release-side element undergoes feedback control so that the turbine rotational speed is equal to a reference rotational speed. Therefore, in comparison with the case where a decrease in the hydraulic pressure of a release-side element is started immediately after a coast downshift is started as in the case of the related art, a decrease in turbine rotational speed is suppressed. By so doing, when shifting from a power-off upshift into a coast downshift, it is possible to reduce uncomfortable feeling to the driver, and it is possible to improve fuel economy by making it possible to continue fuel cut control.

The embodiment described above should be regarded as only illustrative in every respect and not restrictive. The scope of the invention is indicated not by the above description but by the appended claims, and is intended to include all modifications within the meaning and scope equivalent to the scope of the appended claims.

What is claimed is:

1. A control device for an automatic transmission that has a plurality of hydraulic frictional engagement elements including a first element and a second element, comprising:
   a first shift unit that performs a first shift for upshifting from a first gear ratio to a second gear ratio that is higher in speed than the first gear ratio by executing control for releasing the first element and control for engaging the second element; and
   a second shift unit that performs a second shift for downshifting from the second gear ratio to the first gear ratio by executing control for engaging the first element and control for releasing the second element, wherein
   during the second shift, the automatic transmission is configured to: (1) enter a state where no power is transmitted between an input shaft and output shaft of the automatic transmission when the first element is released and the second element is released, and (2) enter a state where power is transmitted between the input shaft and output shaft of the automatic transmission when any one of the first element and the second element is engaged, and wherein
   when the first shift in execution is stopped before completion to perform the second shift, the second shift unit executes control for engaging the first element and executes suppressing control for controlling the second element so as to suppress a decrease in rotational speed of the input shaft of the automatic transmission until the rotational speed of the input shaft starts to increase as the control for engaging the first element progresses, and executes control for releasing the second element after the rotational speed of the input shaft has started to increase.

2. The control device for an automatic transmission according to claim 1, wherein the suppressing control maintains a hydraulic pressure of the second element at the time when control for engaging the first element is started until a predetermined period of time elapses from when the control for engaging the first element is started,
   when the rotational speed of the input shaft does not increase at the time when the predetermined period of time has elapsed, the suppressing control maintains the hydraulic pressure of the second element until the rotational speed of the input shaft decreases below a predetermined rotational speed, and
   the suppressing control executes feedback control over the hydraulic pressure of the second element so that the rotational speed of the input shaft is equal to a reference rotational speed after the rotational speed of the input shaft has decreased below the predetermined rotational speed.

3. The control device for an automatic transmission according to claim 1, wherein the suppressing control is a control for executing feedback control over a hydraulic pressure of the second element so that the rotational speed of the input shaft is equal to a reference rotational speed.

4. The control device for an automatic transmission according to claim 3, wherein the reference rotational speed is set at a value that is lower by a predetermined value than the rotational speed of the input shaft when the second gear ratio, which is a gear ratio after the first shift, is established.

5. The control device for an automatic transmission according to claim 3, wherein an internal combustion engine is connected to the input shaft of the automatic transmission, the internal combustion engine is allowed to execute fuel cut control within a range in which a rotational speed of the internal combustion engine is higher than a predetermined threshold, and the reference rotational speed is set at a value that is higher than the predetermined threshold.

6. The control device for an automatic transmission according to claim 1, wherein the automatic transmission is mounted on a vehicle, the first shift is a power-off upshift that causes the automatic transmission to upshift as an amount of accelerator pedal operation of a driver of the vehicle decreases, and the second shift is a deceleration downshift that causes the automatic transmission to downshift as the vehicle decelerates in a state where the driver of the vehicle is not operating an accelerator pedal.

7. A control method executed by a control device for an automatic transmission having a plurality of hydraulic frictional engagement elements including a first element and a second element, comprising:

a step of performing a first shift for upshifting from a first gear ratio to a second gear ratio that is higher in speed than the first gear ratio by executing control for releasing the first element and control for engaging the second element; and a step of performing a second shift for downshifting from the second gear ratio to the first gear ratio by executing control for engaging the first element and control for releasing the second element, wherein during the second shift, the automatic transmission is configured to: (1) enter a state where no power is transmitted between an input shaft and output shaft of the automatic transmission when the first element is released and the second element is released, and (2) enter a state where power is transmitted between the input shaft and output shaft of the automatic transmission when any one of the first element and the second element is engaged, and wherein when the first shift in execution is stopped before completion to perform the second shift, the step of performing the second shift includes executing control for engaging the first element and executing suppressing control for controlling the second element so as to suppress a decrease in rotational speed of the input shaft of the automatic transmission until the rotational speed of the input shaft starts to increase as the control for engaging the first element progresses, and executing control for releasing the second element after the rotational speed of the input shaft has started to increase.

* * * * *